(12) United States Patent
Rudnev et al.

(10) Patent No.: US 6,859,125 B2
(45) Date of Patent: Feb. 22, 2005

(54) INDUCTION HEAT TREATMENT OF COMPLEX-SHAPED WORKPIECES

(75) Inventors: Valery I. Rudnev, Rochester Hills, MI (US); Don L. Loveless, Rochester, MI (US)

(73) Assignee: Inductoheat, Inc., Madison Heights, MI (US)

( * ) Notice: Subject to any disclaimer, the term of this patent is extended or adjusted under 35 U.S.C. 154(b) by 0 days.

(21) Appl. No.: 10/779,258

(22) Filed: Feb. 13, 2004

(65) Prior Publication Data

US 2004/0183637 A1 Sep. 23, 2004

Related U.S. Application Data

(60) Provisional application No. 60/447,615, filed on Feb. 14, 2003.

(51) Int. Cl.[7] .............................................. H01F 27/08
(52) U.S. Cl. ............................ 336/55; 336/61; 219/672
(58) Field of Search .................... 336/61, 55; 219/635, 219/652, 672, 673, 676

(56) References Cited

U.S. PATENT DOCUMENTS

| | | | | |
|---|---|---|---|---|
| 4,694,134 A | * | 9/1987 | Ross | 219/613 |
| 4,899,025 A | * | 2/1990 | Kamp et al. | 219/635 |
| 5,412,183 A | * | 5/1995 | Buffenoir et al. | 219/637 |
| 6,011,246 A | * | 1/2000 | Bonzano et al. | 219/640 |
| 6,278,354 B1 | * | 8/2001 | Booth | 336/200 |
| 6,498,328 B2 | * | 12/2002 | Anderhuber et al. | 219/645 |
| 6,518,868 B1 | * | 2/2003 | Miller et al. | 336/55 |

* cited by examiner

*Primary Examiner*—Anh Mai
(74) *Attorney, Agent, or Firm*—Philip O. Post (57) ABSTRACT

An inductor for stationary induction heating of one or more components of a complex-shaped workpiece comprises a pair of inductor segments. The first inductor segment is connected to a high frequency ac power supply and the second inductor segment is magnetically coupled to the magnetic field created by the flow of ac current in the first inductor segment. Opposing partial openings in the first and second inductor segments form an opening in which the component can be inductively heated. The first and second inductor segments are alternatively configured in a mix of single turn, multiple single turns connected in parallel, or multiple turn coils in combination to reduce non-uniform induced cross sectional currents across the axial length of the component being inductively heat treated.

13 Claims, 9 Drawing Sheets

INDUCTION HEAT TREATMENT OF COMPLEX-SHAPED WORKPIECES

CROSS REFERENCE TO RELATED APPLICATIONS

This application claims the benefit of U.S. Provisional Application No. 60/447,615 filed Feb. 14, 2003, hereby incorporated herein by reference.

FIELD OF THE INVENTION

The present invention generally relates to inductor coils that are used for heat treatment of complex-shaped workpieces.

BACKGROUND OF THE INVENTION

Figure 1:
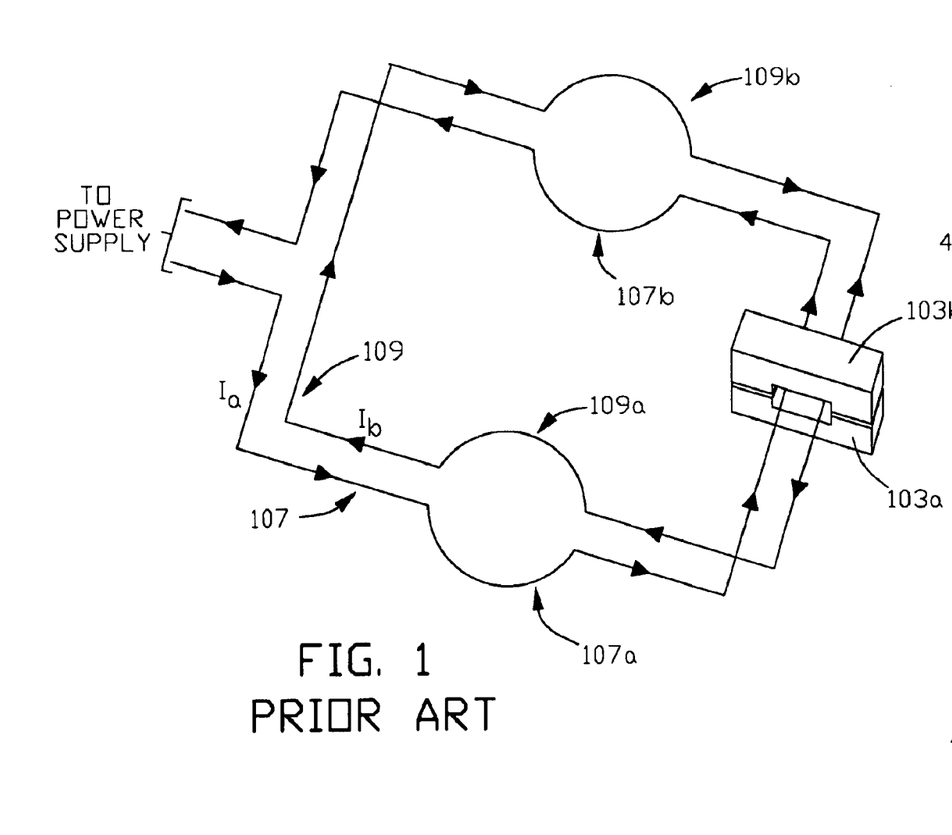
FIG. 1 is a diagrammatic arrangement of prior art active and passive magnetically coupled electrical circuits that can be used to inductively heat treat complex-shaped workpieces.

U.S. Pat. No. 6,274,857 (the 857 patent), which is incorporated herein in its entirety, discloses a method of induction heat treatment of an irregularly shaped workpiece, such as a crankshaft. The 857 patent discloses the use of a mating pair of coil segments, one in an active electrical circuit and one in a passive electrical circuit, to induction harden components of the workpiece, such as a crankshaft's pin or main. FIG. 1 is a diagrammatic illustration of one configuration for accomplishing induction hardening as taught in the 857 patent. In the figure, ac current $I_a$ flows through first inductor segment 107 as illustrated by the direction of the arrows (instantaneous ac current). The lines diagrammatically illustrating first inductor segment 107 are connected to a suitable ac power supply, making the first inductor segment an active electrical circuit formed from a single turn inductor segment. Coil segments 107a and 107b are provided in first inductor segment 107. Current $I_a$ creates a magnetic flux field around the active inductor coil segment. Coil segments 109a and 109b are provided in second inductor segment 109, which is a passive electrical circuit formed from a single turn inductor coil segment. Magnetic flux concentrator segments 103a and 103b form a magnetic flux concentrator that couples magnetic flux surrounding the active inductor segment to the passive inductor segment and induces ac current $I_b$ in second inductor segment 109 as illustrated by the direction of the arrows (instantaneous ac current).

Figure 2A:
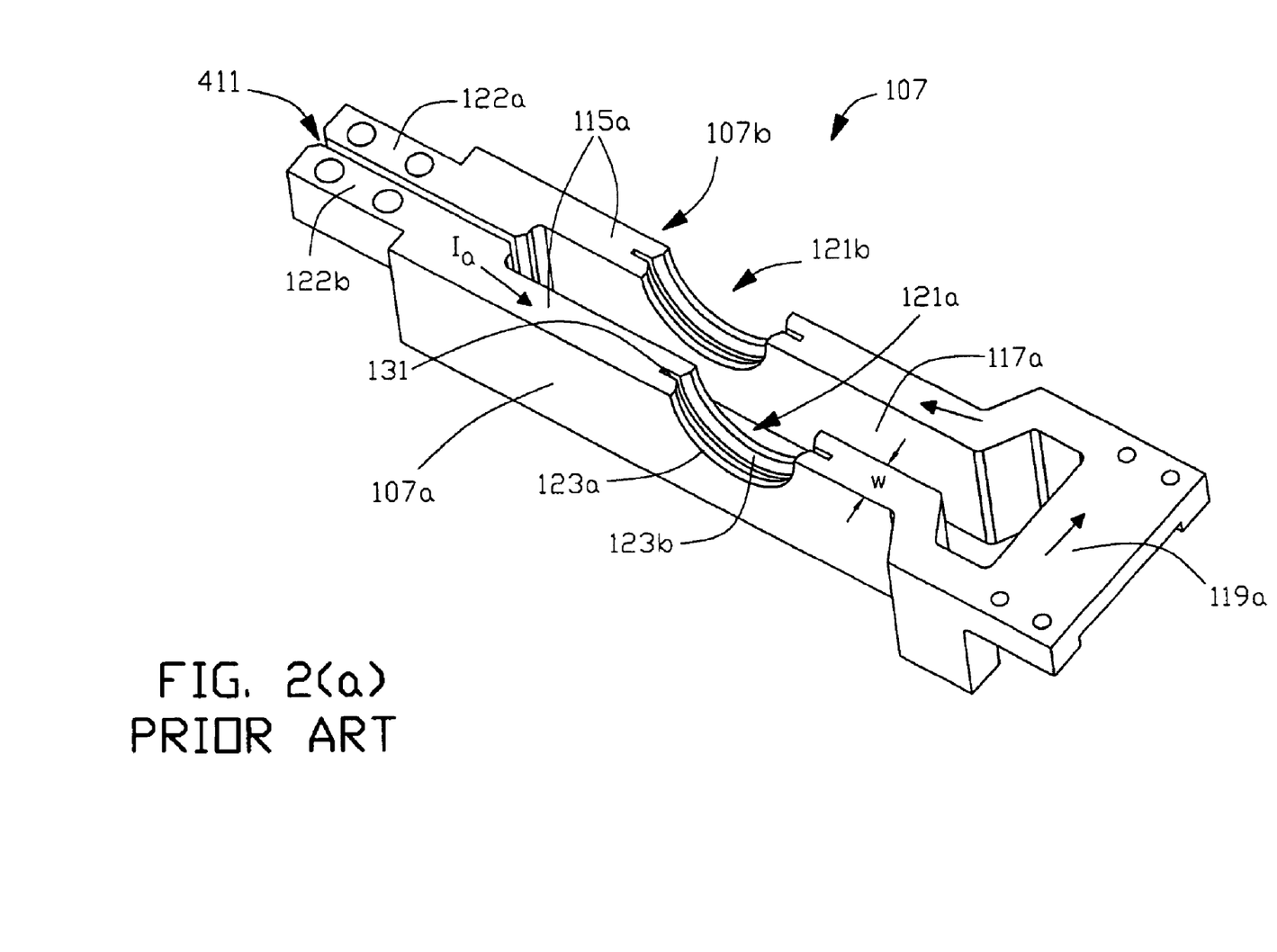
FIG. 2(a) illustrates a prior art active inductor segment that can be used to inductively heat treat complex-shaped workpieces.
Figure 2B:
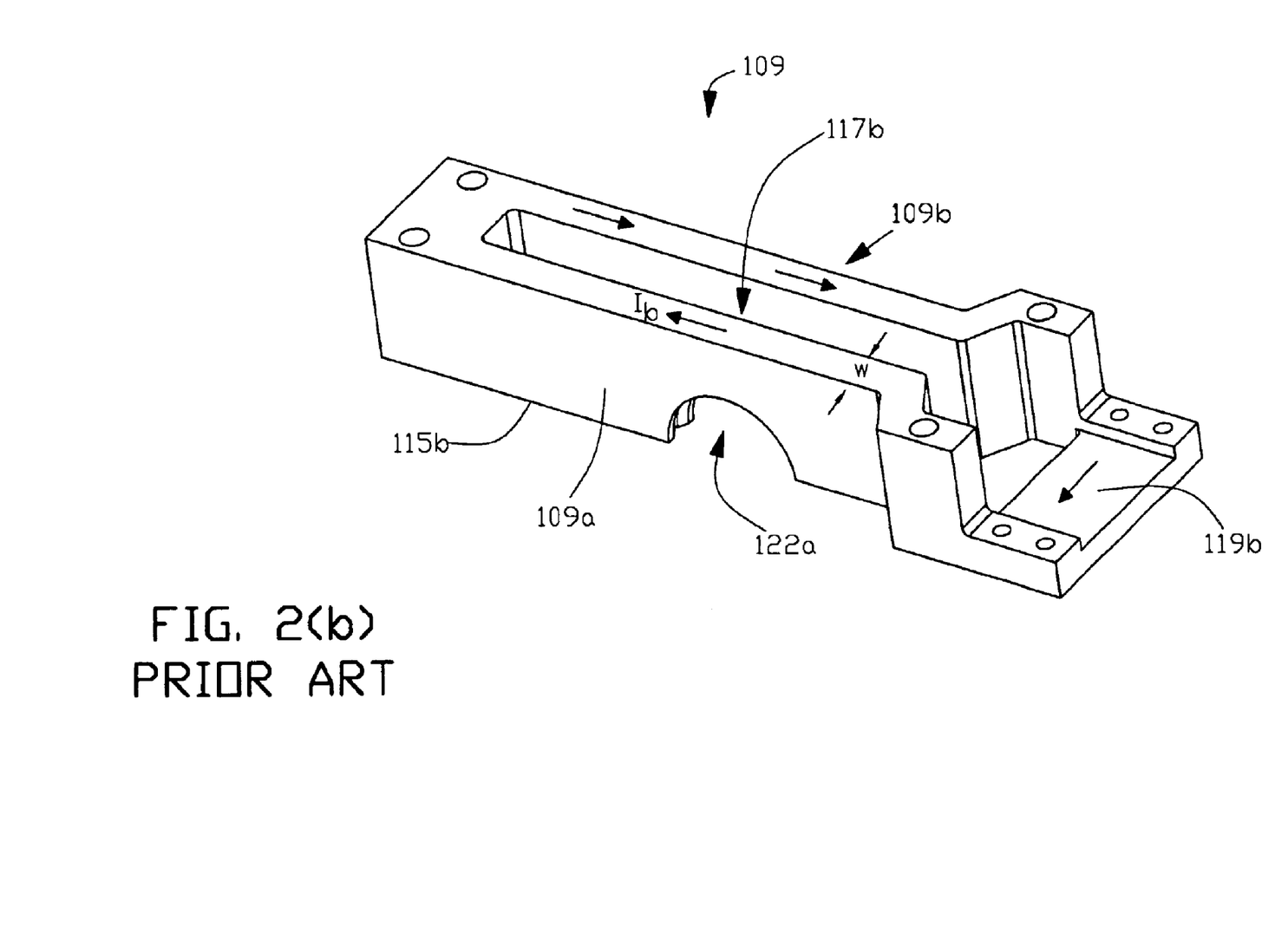
FIG. 2(b) illustrates a prior art passive inductor segment that can be used to inductively heat treat complex-shaped workpieces.
Figure 2C:
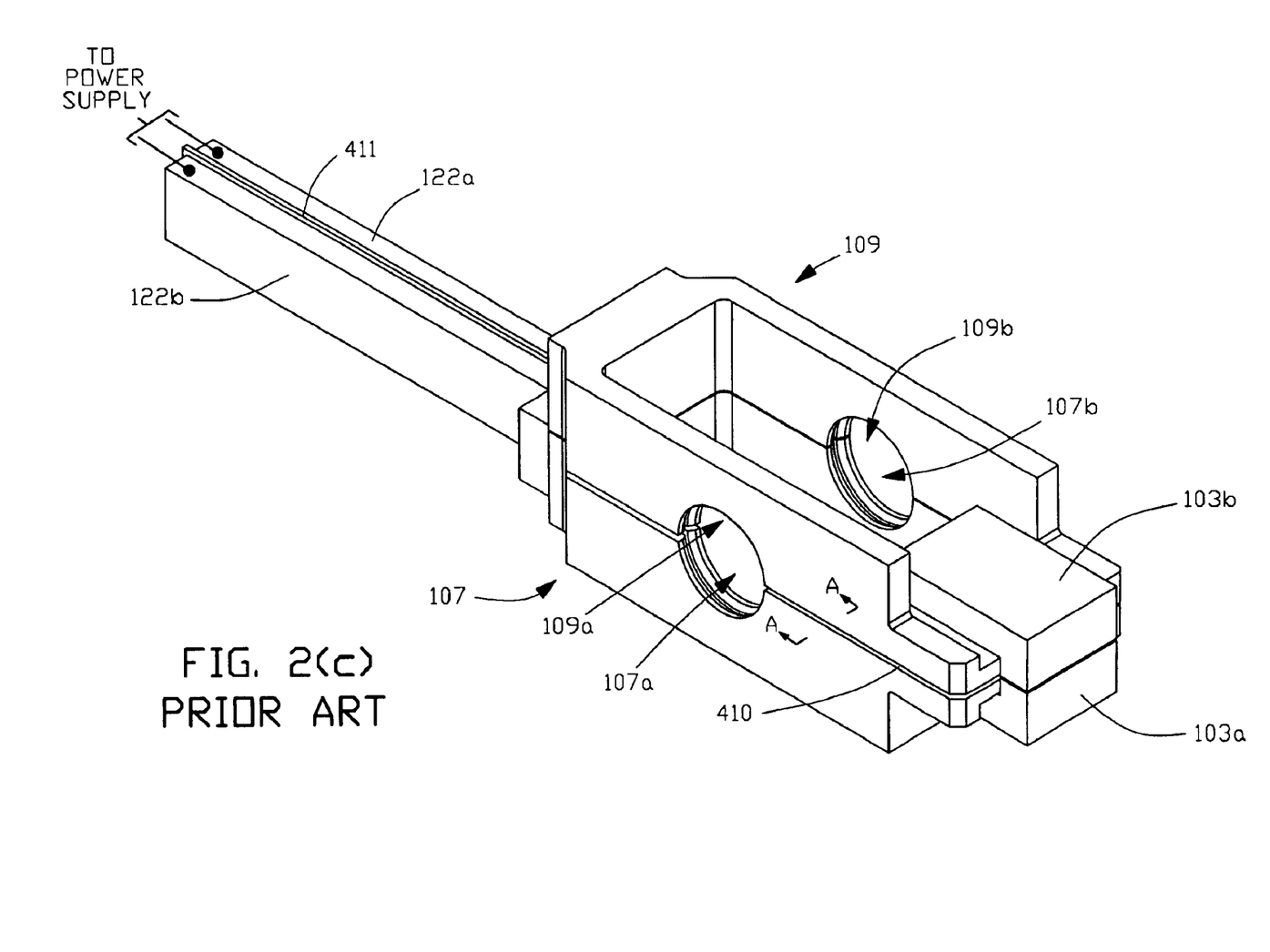
FIG. 2(c) illustrates the active and passive inductor segments shown in FIG. 2(a) and FIG. 2(b) in position to inductively heat a component of a complex-shaped workpiece.

FIG. 2(a) and FIG. 2(b) respectively illustrate one example of a prior art active (first) inductor segment 107 and passive (second) inductor segment 109 that can be used to realize the diagrammatic circuits in FIG. 1. In FIG. 2(a) power termination regions 122a and 122b provide a means for connecting the active inductor segment to a suitable high frequency ac power supply. Dielectric 411 can be used to provide sufficient electrical insulation between the two regions. In FIG. 2(a) and FIG. 2(b) interior through openings 117a and 117b, respectively, split the first and second inductor segments, respectively, into two coil segments. Each of these coil segments has a partial opening, such as openings 121a and 121b in coil segments 107a and 107b, respectively. Each coil segment around its opening can be designed with inner and outer coil lips separated by a quench orifice, such as inner and outer coil lips 123b and 123a, respectively, between quench orifice 131 in coil segment 107a. FIG. 2(c) illustrates the prior art active and passive inductor segments 107 and 109, respectively, properly positioned to inductively heat treat two components of a workpiece, each of which is positioned within the opening formed around a pair of coil segments, namely first pair of coil segments 107a and 109a (openings 121a and 122a), and second pair of coil segments 107b and 109b. Magnetic flux concentrators 103a and 103b are placed around the magnetic flux concentrator coupling regions 119a and 119b of the first and second inductor segments, respectively. Dielectric 410 separates the coil-facing surfaces 115a and 115b of the first and second inductor segments, respectively. Depending upon the workpiece component being inductively heat treated in a particular opening formed around a pair of coil segments, through openings 117a and 117b can also serve as the situs (residence) for a non-heat-treated workpiece component that joins the one or two workpiece components together.

Figure 3A:
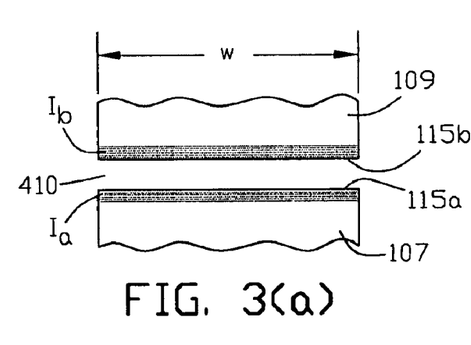
FIG. 3(a) and FIG. 3(b) illustrate the difference between uniform and non-uniform cross sectional current density in inductor segments.
Figure 3B:
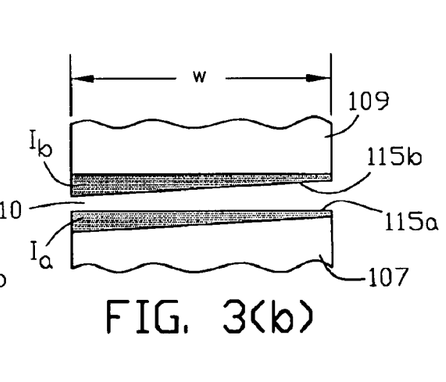

With efficient magnetic coupling, the magnitude of the induced current $I_b$ in the passive inductor segment will be approximately equal in magnitude to, and 180 electrical degrees out of phase with, the active current $I_a$ in the active inductor segment. Approximately equal magnitudes for currents $I_a$ and $I_b$ does not insure equal current densities across the width of a coil segment. Equal cross sectional current densities in the active and passive circuits' facing coil segments is essential for uniform induction heating of the component of a workpiece placed within an opening formed by an opposing pair of coil segments. Non-uniformity of the electrically conductive material that an inductor segment is made of, or deviation from exact parallel plane relationship between the facing surfaces of a pair of inductor segments, can result in non-uniform current densities across the cross sectional width of the inductor segment. FIG. 3(a) and FIG. 3(b) are partial cross sectional views of opposing first and second inductor segments, at line A—A in FIG. 2(c). FIG. 3(a) illustrates a typical pair of opposing inductor segments 107 and 109 with ideal uniform cross sectional current densities (dotted region) for currents $I_a$ and $I_b$. FIG. 3(b) illustrates a more realistic situation wherein the opposing coil-facing surfaces 115a and 115b are not parallel to each other, and both cross sectional current densities for currents $I_a$ and $I_b$ are non-uniform. In this example, coil-facing surface 115b of inductor segment 109 is not parallel with coil-facing surface 115a of opposing inductor segment 107. Consequently, due to the electromagnetic phenomenon known as the proximity effect, induced current $I_b$ density is greater in the cross sectional region with a smaller air gap, which in turn will result in a current density re-distribution of active current $I_a$.

Figure 4:
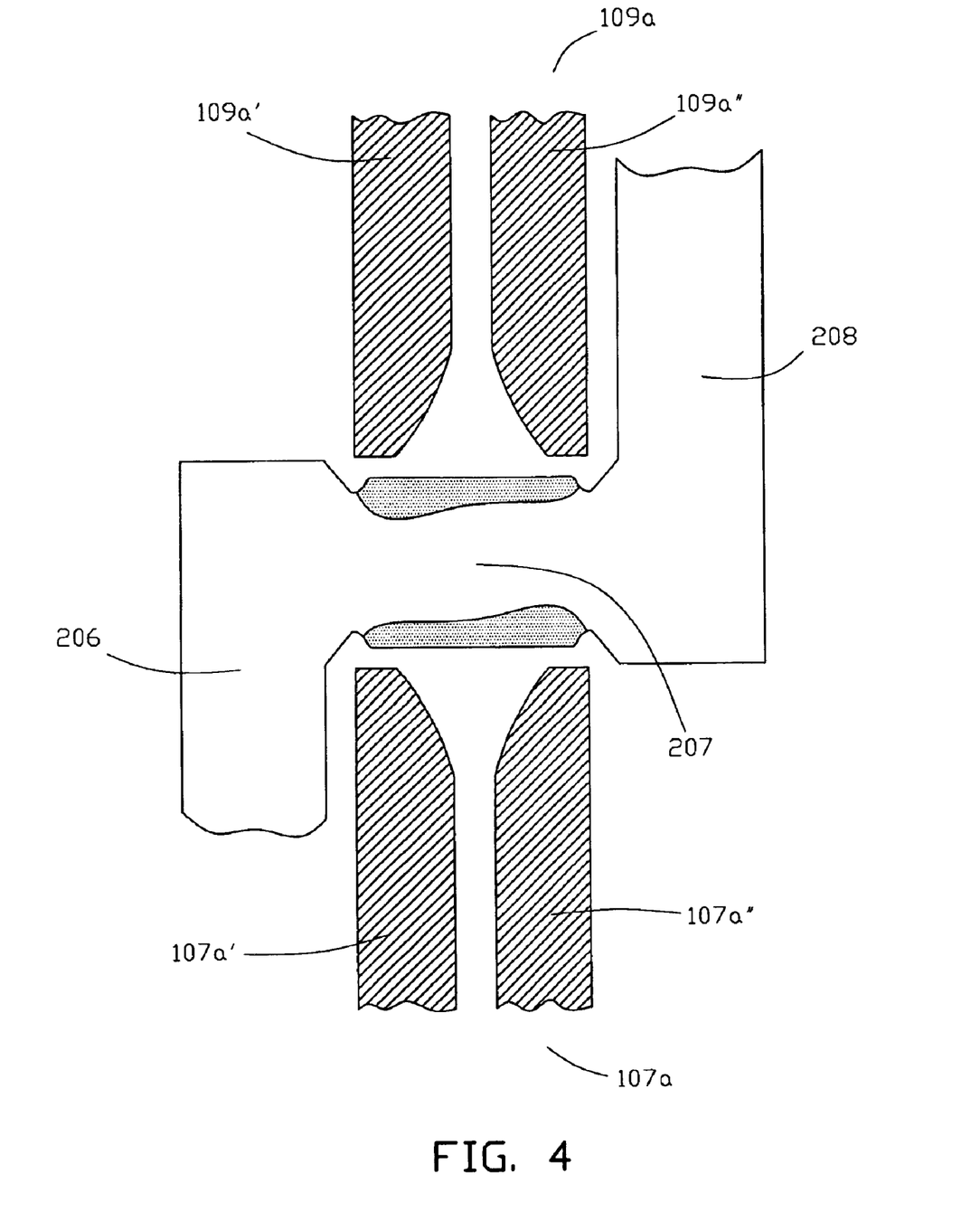
FIG. 4 illustrates typical non-uniform cross sectional current density in a workpiece component during induction heat treatment that results from the presence of bounding adjoining workpiece components.

Uniformity of current densities in opposing active and passive coil segments can be impacted by the presence of electrically conductive masses on the complex-shaped workpiece that are located adjacent to the workpiece component being inductively heat treated in an opening between a pair of coil segments. FIG. 4 illustrates a workpiece component 207 situated between a pair of opposing coil segments 107a and 109a, formed from coil lips 107a' and 107a", and coil lips 109a' and 109a", respectively. Workpiece component 207, which will be inductively heat treated, is joined to bounding adjoining workpiece components 206 and 208, which will not be inductively heat treated. If the workpiece is a crankshaft, then component 207 may be a pin or main (with or without an oil passage in it), and the bounding adjoining workpiece components represent non-symmetrical counterweights on the crankshaft.

As disclosed in the 857 patent, two or more identical number of turns can be provided for both the active and passive inductor segments. However active and passive multi-turn inductor circuits require higher operating voltages than that for an equivalent single-turn arrangement. The higher operating voltages introduce the potential for arcing between adjacent circuit conductors with a small air gap that decreases reliability and maintainability.

Therefore, an object of the present invention is inductor segments that minimize non-uniform distribution of current density across the inductor to achieve uniform induction heat treatment of a workpiece component of a complex-shaped workpiece.

BRIEF SUMMARY OF THE INVENTION

In one aspect, the present invention is an inductor and method for heat treating at least one substantially cylindrical component of a metal workpiece wherein the substantially cylindrical component is attached on at least one side to an irregularly-shaped component to form a fillet between the irregularly-shaped component and the substantially cylindrical-shaped component. The inductor is formed from first and second inductor segments and the second inductor segment is magnetically coupled to the first inductor segment. The first inductor segment is connected to an ac high frequency power source. A substantially closed opening is formed partially in the first inductor segment and partially in the second inductor segment for placement of the substantially cylindrical component for heat treating by application of a magnetic filed generated by the inductor formed from the first and second inductor segments in response to excitation by high frequency ac current from the ac high frequency power supply.

In one example of the invention, the first inductor segment is formed from a solid electrically conductive material. The first inductor segment has a facing surface and a through opening forming first and second coil segments disposed on opposing sides of the through opening. A cross sectional current restricting slit divides each of the first and second coil segments into a first and second pair of coil sub-segments. A first partial opening in either the first or second coil segment has an arcuate coil surface on either side of the cross sectional current restricting slit. Each of these arcuate coil surfaces is divided by an orifice to form a first and second pairs of coil lips. The first and second pairs of coil lips form interface regions with the adjoining first facing surfaces. The first and second pairs of coil lips are profiled to selectively compensate for the irregular mass of the irregularly-shaped component, for an opening on the surface of the substantially cylindrical component, or for selective heating of the fillet. The second inductor is formed from a solid electrically conductive material. The second inductor segment has a second facing surface disposed substantially adjacent to and electrically isolated from the first facing surface. A through opening in the second inductor segment forms third and fourth coil segments disposed on opposing sides of the through opening. A second partial opening in either the third or fourth coil segment has an arcuate surface divided by an orifice to form a third pair of coil lips. The third pair of coil lips form interface regions with the adjoining second facing surface. The third pair of coil lips are profiled to selectively compensate for the irregular mass of the irregularly-shaped component, for an opening in the surface of the substantially cylindrical component, or for selective heating of the fillet.

In another example of the invention, the first inductor segment is formed from a solid electrically conductive material. The first inductor segment has a facing surface and a through opening forming first and second coil segments disposed on opposing sides of the through opening. A first inductor segment cross sectional current restricting slit divides each of the first and second coil segments into a first and second pair of coil sub-segments. A first partial opening in either the first or second coil segment has an arcuate coil surface on either side of the cross sectional current restricting slit. Each of these arcuate coil surfaces is divided by an orifice to form a first and second pairs of coil lips. The first and second pairs of coil lips form interface regions with the adjoining first facing surfaces. The first and second pairs of coil lips are profiled to selectively compensate for the irregular mass of the irregularly-shaped component, for an opening on the surface of the substantially cylindrical component, or for selective heating of the fillet. The second inductor is formed from a solid electrically conductive material. The second inductor segment has a second facing surface disposed substantially adjacent to and electrically isolated from the first facing surface. A through opening in the second inductor segment forms third and fourth coil segments disposed on opposing sides of the through opening. At least one second inductor segment cross sectional current restricting slit divides the second inductor segment into at least two series coil turns. The at least two coil turns form an at least two coil turn segments on each side of the through opening. A second partial opening in the at least two coil turn segments on either side of the through opening has an arcuate surface divided by an orifice to form a third and fourth pairs of coil lips. The third and fourth pairs of coil lips form interface regions with the adjoining second facing surfaces. The third and fourth coil lips are profiled to selectively compensate for the irregular mass of the irregularly-shaped component, for an opening on the surface of the substantially cylindrical component, or for selective heating of the fillet.

In another example of the invention, the first inductor segment is formed from a solid electrically conductive material. The first inductor segment has a facing surface and a through opening forming first and second coil segments disposed on opposing sides of the through opening. A first inductor coil segment cross sectional current restricting slit divides each of the first and second coil segments into a first and second pair of coil sub-segments. A first partial opening in either the first or second coil segment has an arcuate coil surface on either side of the cross sectional current restricting slit. Each of these arcuate coil surfaces is divided by an orifice to form a first and second pairs of coil lips. The first and second pairs of coil lips form interface regions with the adjoining first facing surfaces. The first and second pairs of coil lips are profiled to selectively compensate for the irregular mass of the irregularly-shaped component, an opening on the surface of the substantially cylindrical component, or selective heating of the fillet. The second inductor is formed from a solid electrically conductive material. The second inductor segment has a second facing surface disposed substantially adjacent to and electrically isolated from the first facing surface. A through opening in the second inductor segment forms third and fourth coil segments disposed on opposing sides of the through opening. A second inductor segment cross sectional current restricting slit divides the second inductor segment into an inner and outer second inductor segments. A second partial opening in the inner and outer second inductor segments on either side of the through opening has an arcuate surface divided by an orifice to form a third and fourth pairs of coil lips. The third and fourth pairs of coil lips form interface regions with the adjoining second facing surfaces. The third and fourth pairs of coil lips are profiled to selectively compensate for the irregular mass of the irregularly-shaped component, for an opening on the surface of the substantially cylindrical component, or for selective heating of the fillet.

In another example of the invention, the first inductor segment is formed from a solid electrically conductive material. The first inductor segment has a facing surface and a through opening forming first and second segments disposed on opposing sides of the through opening. A first partial opening in either the first or second coil segment has an arcuate coil surface divided by an orifice to form a first pair of coil lips. The first pair of coil lips form interface regions with the adjoining first facing surface. The first pair of coil lips are profiled to selectively compensate for the irregular mass of the irregularly-shaped component, for an opening on the surface of the substantially cylindrical component, or for selective heating of the fillet. The second inductor is formed from a solid electrically conductive material. The second inductor segment has a second facing surface disposed substantially adjacent to and electrically isolated from the first facing surface. A through opening in the second inductor segment forms second and third coil segments disposed on opposing sides of the through opening. A cross sectional current restricting slit divides the second inductor segment into an inner inductor segment and an outer second inductor segment that are electrically isolated from each other. A second partial opening in the inner and outer second inductor segments on either side of the through opening has an arcuate surface divided by an orifice to form a second and third pairs of coil lips. The third and fourth pairs of coil lips form interface regions with the adjoining second facing surfaces. The second and third pairs of coil lips are profiled to selectively compensate for the irregular mass of the irregularly-shaped component, for an opening on the surface of the substantially cylindrical component, or for selective heating of the fillet.

In another aspect the present invention is an induction heat treatment station for the heat treatment of a metal workpiece, such as a crankshaft, that has one or more substantially cylindrical workpiece components axially offset and parallel to the main axis of the workpiece and two or more substantially cylindrical workpiece components axially aligned with the main axis of the workpiece, wherein an inductor of the present invention is used to inductively heat the workpiece components.

Other aspects of the invention are set forth in this specification.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 5:
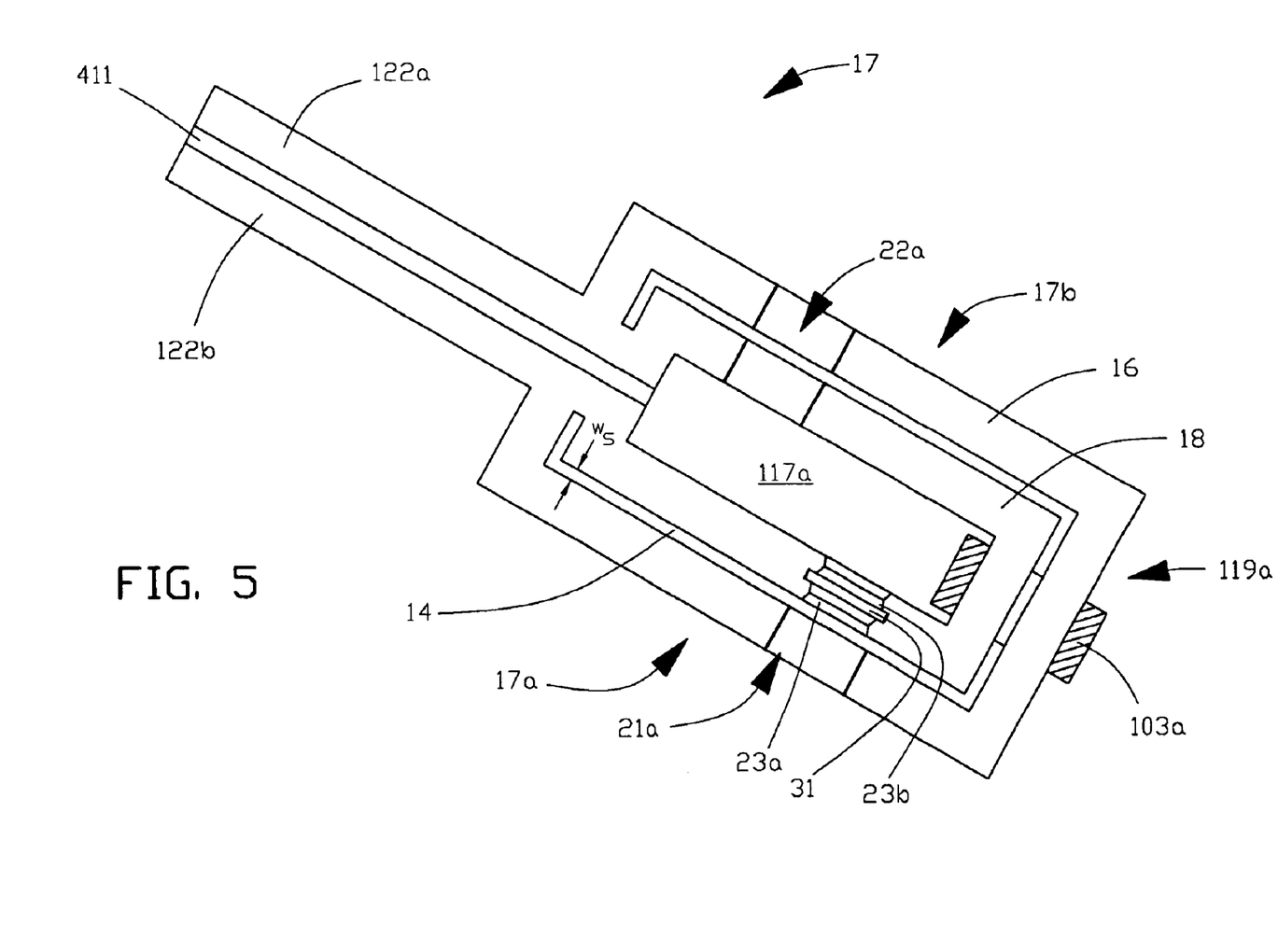
FIG. 5 is a facing planar view of one example of an active inductor segment of the present invention configured as two turns connected in parallel that can be used to inductively heat treat complex-shaped workpieces.

Referring now to the drawings, wherein like numerals indicate like elements, there is shown in FIG. 5, one example of an active inductor segment of the present invention that can be used to inductively heat treat a component of a complex workpiece. Active inductor segment 17 comprises two coil turns 16 and 18 connected together in parallel. FIG. 5 is a facing planar view of the active inductor segment. Cross sectional current restricting slit 14 forms the two coil turns in the active inductor segment that are connected together in parallel at the power termination regions 122a and 122b. Slit 14 is sufficiently large to prevent arcing between the two coil turns and may be filled with a dielectric material. Typically, but not by way of limitation, the width of slit 14 is within the range of 1 mm to 5 mm, depending upon the features of the inductively heated component. Slit 14 minimizes non-uniformity of the cross sectional current densities since it interrupts cross sectional current paths in the coil turns. The combination of coil turns 16 and 18 form coil segments 17a and 17b on opposing sides of through opening 117a. In the example shown in FIG. 5, slit 14 extends completely through both coil segments 17a and 17b, and magnetic flux concentrator region 119a. In alternate examples of the invention, the slit may be limited to the two coil segments, thereby forming two discrete slits. Preferably, slit 14 extends through both coil segments to improve uniformity of the current distribution within every coil segment.

Either one or both coil segments have a partial opening, such as partial openings 21a and 22a in coil segments 17a and 17b, respectively. The arcuate coil surface of each of the two coil turns in each partial opening can be formed into a pair of coil lips that are each separated by a quench orifice, as representatively shown in FIG. 5 as inner coil lips 23b, outer coil lips 23a, and orifice 31. The coil lips are profiled to selectively compensate for the irregular mass of the irregularly-shaped component, for an opening on the surface of the substantially cylindrical component, or for selective heating of the fillet.

Single slit 14 generally separates each coil segment into two coil turns equal in width. More than one cross sectional current restricting slit may be provided.

Active inductor segment 17 in FIG. 5 may be used in combination with the passive single turn inductor segment shown in FIG. 2(b). In this example of the invention, improved uniform cross sectional distribution of the current density in the active inductor segment will result in an improved uniform cross sectional distribution of the current density in the passive inductor segment since the direction of the instantaneous currents through the two coil turns formed between slit 14 will be opposite in direction to the current in the passive single turn inductor segment. Thus the currents in each of the two coil turns in the active inductor segment will each attract a comparable amount of current in the passive inductor segment.

Figure 6:
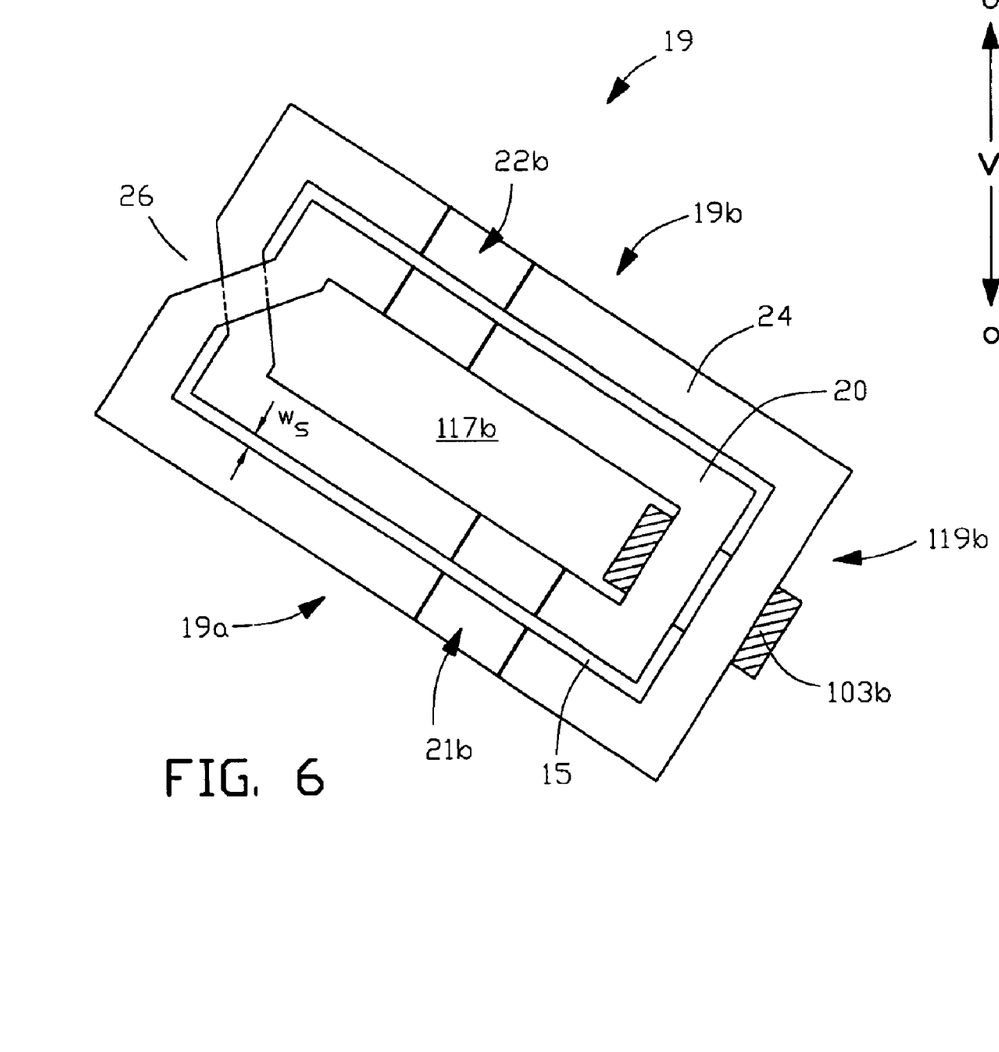
FIG. 6 is a facing planar view of one example of a passive inductor segment of the present invention configured as a two turn series coil that can be used to inductively heat treat complex-shaped workpieces.

Alternatively active inductor segment 17 may be used with a two turn passive inductor segment. FIG. 6 illustrates a facing planar view of one example of a two turn passive inductor segment of the present invention. Two turn passive inductor segment 19 comprises two coil turns 20 and 24 formed from cross sectional current restricting slit 15 with crossover region 26. When used with active inductor segment 17 in FIG. 5, the width, $w_s$, of slit 15 in the passive inductor segment is generally equal to the width, $w_s$, of slit 14 in the active inductor segment. Coil lips are profiled around an orifice in the arcuate surface around partial openings 21b and 22b of each of the two coil turns that make up coil segment 19a and/or coil segment 19b, respectively. Since the two turns in the passive inductor segment are connected in series, the induced current that flows in both turns is the same. Therefore the density of the current that flows in the active inductor segment will also be distributed according to the density of the current in the passive inductor segment when active inductor segment 17 is properly positioned adjacent to two turn passive inductor segment 19.

Figure 7:
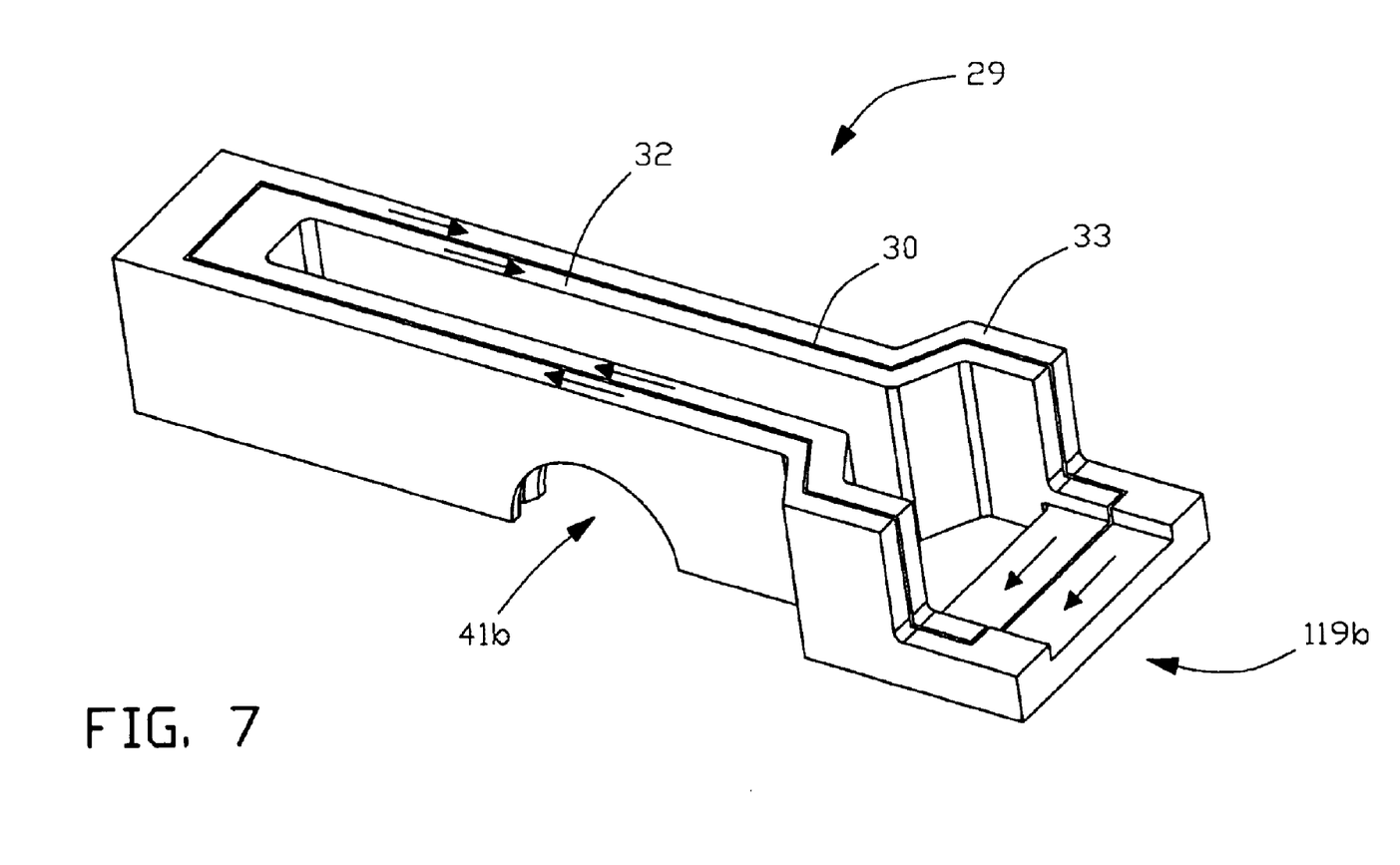
FIG. 7 is a perspective view of one example of a passive inductor segment of the present invention configured as two electrically isolated coil turns that can be used to inductively heat treat complex-shaped workpieces.

FIG. 7 illustrates an alternative passive inductor segment of the present invention. In this example, passive inductor segment 29 is split into two electrically isolated coils 32 and 33 by cross sectional current restricting slit 30. In this configuration the passive inductor segment comprises an inner and outer coil with one or more partial openings, such as partial opening 41b. Passive inductor segment 29 is used in combination with either the active inductor segment shown in FIG. 2(a) or FIG. 5. A passive coil with two electrically isolated coils is not as effective as a series-connected two (or more) turn passive inductor segment in providing a uniform distribution of cross sectional current density, but it is simpler to manufacture and offers an improvement over the prior art.

Figure 8A:
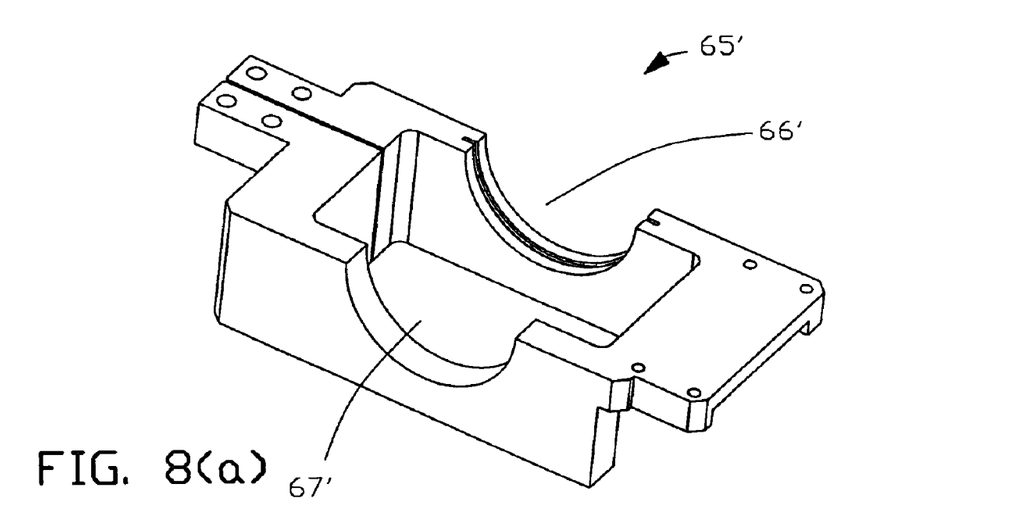
FIG. 8(a) and FIG. 8(b) are perspective views of one example of a pair of opposing active and passive inductor segments of the present invention that can be used to heat treat one end workpiece component where the end of the workpiece has a protruding non-heat treated end element.
Figure 8B:
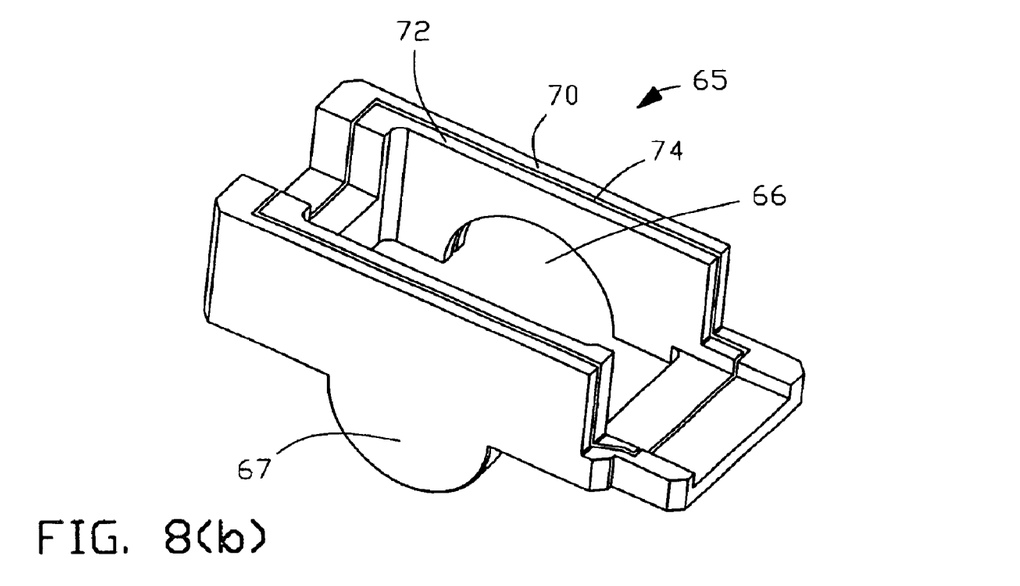
Figure 9:
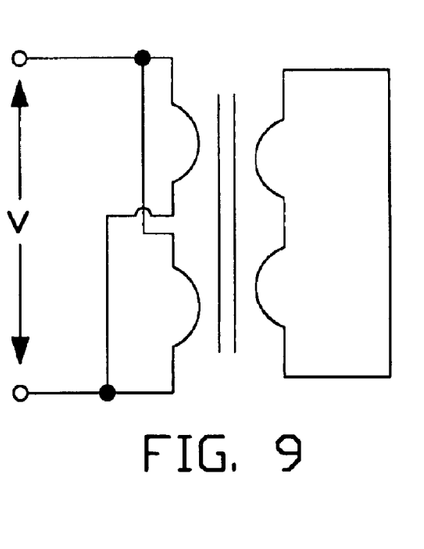
FIG. 9 is a diagrammatic arrangement of the electrical circuits when the active inductor segment shown in FIG. 5 is used with the passive inductor segment shown in FIG. 6 to inductively heat treat one or more components of a complex-shaped workpieces.

FIG. 8(a) and FIG. 8(b) illustrate one example of a pair of active and passive inductor segments, 65' and 65, respectively, that can be used to inductively heat treat the end component of a complex-shaped workpiece with an axially protruding non-heat treated adjoining end element. For example, when the workpiece is a crankshaft, the end component to be heat treated is the main and the axially protruding non-heat treated adjoining end element is the crank nose. Active inductor segment 65' comprises a single turn coil. Passive inductor segment 65 comprises two electrically isolated coils 70 and 72 separated by a cross sectional current restricting slit 74. The component is induction heat treated in the opening formed from partial openings 66 and 66'. Semicircular element 67 seats in semicircular opening 67'. The advantages of the example of the invention shown in FIG. 8(a) and FIG. 8(b) are similar to those achieved with the combination of the active inductor segment shown in FIG. 2(a) and the passive inductor segment shown in FIG. 7.

The pair of opposing coil lips in a coil turn separated by a cross sectional current restricting slit may be positioned so that they inductively heat only the fillet region between the workpiece component situated between a pair of coil segments and its adjoining workpiece component. In this arrangement the cross sectional current restricting slit typically is wider and may be filled with a flux concentrator to further direct induction heating to the fillet regions. Typically, but not by way of limitation, the width of a cross sectional current restricting slit in this type of application can be within the range of 6 mm to 25 mm, depending upon the features of the inductively heated component.

The foregoing examples do not limit the scope of the disclosed invention. The scope of the disclosed invention is further set forth in the appended claims.

What is claimed is:

1. An inductor for heating at least one substantially cylindrical component of a metal workpiece, the substantially cylindrical component attached on at least one side to an irregularly-shaped component, a fillet formed between the irregularly-shaped component and the substantially cylindrical component, the inductor formed from a first inductor segment and a second inductor segment, the first and second inductor segments having means for magnetically coupling to the second inductor segment an ac high frequency current supplied to the first inductor segment, a substantially closed opening formed partially in the first inductor segment and partially in the second inductor segment for placement of the substantially cylindrical component for heating by application of a magnetic field to the component, the magnetic field generated by the first and second inductor segments in response to excitation by the ac high frequency current, the first inductor segment formed from a solid electrically conductive material, the first inductor segment further comprising:

a first facing surface; and a first through opening forming a first coil segment and a second coil segment disposed on opposing sides of the first through opening;

the second inductor segment formed from a solid electrically conductive material, the second inductor segment further comprising:

a second facing surface, the second facing surface disposed substantially adjacent to and electrically isolated from the first facing surface; and a second through opening forming a third coil segment and a fourth coil segment disposed on opposing sides of the second through opening;

the improvement comprising:

at least one cross sectional current restricting slit disposed in the first coil segment and the second coil segment to form at least two parallel coils in the first inductor segment, the at least one cross sectional current restricting slit dividing each of the first and second coil segments into a first and second pair of coil sub-segments, a first partial opening in either of the first or second pair of coil sub-segments comprising the first or second coil segment, the first partial opening having an arcuate coil surface divided by an orifice in at least one of the pair of coil sub-segments forming the first partial opening, the orifice dividing the arcuate coil surface into a first pair of coil lips, the first pair of coil lips forming an interface region with the adjoining first facing surface wherein the first pair of coil lips are profiled to selectively compensate for the irregular mass of the irregularly-shaped component, an opening on the surface of the substantially cylindrical component, or selective heating of the fillet;

a second partial opening in either the third or fourth coil segment, the second partial opening having an arcuate coil surface divided by an orifice, the orifice dividing the arcuate coil surface into a second pair of coil lips, the second pair of coil lips forming an interface region with the adjoining second facing surface wherein the second pair of coil lips are profiled to selectively compensate for the irregular mass of the irregularly-shaped component, an opening on the surface of the substantially cylindrical component, or selective heating of the fillet, the first and second partial openings forming the substantially closed opening.

2. An inductor for heating at least one substantially cylindrical component of a metal workpiece, the substantially cylindrical component attached on at least one side to an irregularly-shaped component, a fillet formed between the irregularly-shaped component and the substantially cylindrical component, the inductor formed from a first inductor segment and a second inductor segment, the first and second inductor segments having means for magnetically coupling to the second inductor segment an ac high frequency current supplied to the first inductor segment, a substantially closed opening formed partially in the first inductor segment and partially in the second inductor segment for placement of the substantially cylindrical component for heating by application of a magnetic field to the component, the magnetic field generated by the first and second inductor segments in response to excitation by the ac high frequency current, the first inductor segment formed from a solid electrically conductive material, the first inductor segment further comprising:

a first facing surface; and a first through opening forming a first coil segment and a second coil segment disposed on opposing sides of the first through opening;

the second inductor segment formed from a solid electrically conductive material, the second inductor segment further comprising:

a second facing surface, the second facing surface disposed substantially adjacent to and electrically isolated from the first facing surface; and a second through opening forming a third coil segment and a fourth coil segment disposed on opposing sides of the second through opening;

the improvement comprising:

at least one active cross sectional current restricting slit disposed in the first coil segment and the second coil segment to form at least two parallel coils in the first inductor segment, the at least one active cross sectional current restricting slit dividing each of the first and second coil segments into a first and second pair of coil sub-segments, a first partial opening in either of the first or second pair of coil sub-segments comprising the first or second coil segment, the first partial opening having an arcuate coil surface divided by an orifice in at least one of the pair of coil sub-segments forming the first partial opening, the orifice dividing the arcuate coil surface into a first pair of coil lips, the first pair of coil lips forming an interface region with the adjoining first facing surface wherein the first pair of coil lips are profiled to selectively compensate for the irregular mass of the irregularly-shaped component, an opening on the surface of the substantially cylindrical component, or selective heating of the fillet;

at least one passive cross sectional current restricting slit disposed in the third coil segment and fourth coil segment to form at least two series coils in the second inductor segment, the at least one passive cross sectional current restricting slit dividing each of the third and fourth coil segments into a third and fourth pair of coil sub-segments, a second partial opening in either of the first or second pair of coil sub-segments comprising the third or fourth coil segment, the second partial opening having an arcuate coil surface divided by an orifice in at least one of the pair of coil sub-segments forming the second partial opening, the orifice dividing the arcuate coil surface into a first pair of coil lips, the first pair of coil lips forming an interface region with the adjoining second facing surface wherein the second pair of coil lips are profiled to selectively compensate for the irregular mass of the irregularly-shaped component, an opening on the surface of the substantially cylindrical component, or selective heating of the fillet, the first and second partial openings forming the substantially closed opening.

3. The inductor of claim 2 wherein the number of the at least one active cross sectional current restricting slits is equal to the number of the at least one passive cross sectional current restricting slits and each of the at least one active cross sectional current restricting slits is oppositely aligned from each of the at least one passive cross sectional current restricting slits.

4. The inductor of claim 3 wherein the widths of all of the at least one active and passive cross sectional current restricting slits are equal.

5. The inductor of claim 4 wherein there is one active cross sectional current restricting slit and one passive cross sectional current restricting slit and the active and passive cross sectional current restricting slits are sufficiently large so that only the fillet is substantially inductively heated.

6. The inductor of claim 5 wherein a flux concentrator is disposed in the spaced formed by the current restricting slits to direct the magnetic field toward the fillet.

7. An inductor for heating at least one substantially cylindrical component of a metal workpiece, the substantially cylindrical component attached on at least one side to an irregularly-shaped component, a fillet formed between the irregularly-shaped component and the substantially cylindrical component, the inductor formed from a first inductor segment and a second inductor segment, the first and second inductor segments having means for magnetically coupling to the second inductor segment an ac high frequency current supplied to the first inductor segment, a substantially closed opening formed partially in the first inductor segment and partially in the second inductor segment for placement of the substantially cylindrical component for heating by application of a magnetic field to the component, the magnetic field generated by the first and second inductor segments in response to excitation by the ac high frequency current, the first inductor segment formed from a solid electrically conductive material, the first inductor segment further comprising:

a first facing surface; and a first through opening forming a first coil segment and a second coil segment disposed on opposing sides of the first through opening;

the second inductor segment formed from a solid electrically conductive material, the second inductor segment further comprising:

a second facing surface, the second facing surface disposed substantially adjacent to and electrically isolated from the first facing surface; and a second through opening forming a third coil segment and a fourth coil segment disposed on opposing sides of the second through opening;

the improvement comprising:
- at least one cross sectional current restricting slit disposed within the second inductor segment to form at least two electrically isolated coils in the second inductor segment, the at least one cross sectional current restricting slit dividing each of the third and fourth coil segments into a first and second pair of coil sub-segments, and
- a first partial opening in either of the first or second pair of coil sub-segments comprising the third or fourth coil segment, the first partial opening having an arcuate coil surface divided by an orifice in at least one of the pair of coil sub-segments forming the first partial opening, the orifice dividing the arcuate coil surface into a first pair of coil lips, the first pair of coil lips forming an interface region with the adjoining second facing surface wherein the first pair of coil lips are profiled to selectively compensate for the irregular mass of the irregularly-shaped component, an opening on the surface of the substantially cylindrical component, or selective heating of the fillet;
- a second partial opening in either of the first or second coil segment, the second partial opening having an arcuate coil surface divided by an orifice, the orifice dividing the arcuate coil surface into a second pair of coil lips, the second pair of coil lips forming an interface region with adjoining the first facing surface wherein the second pair of coil lips are profiled to selectively compensate for the irregular mass of the irregularly-shaped component, an opening on the surface of the substantially cylindrical component, or selective heating of the fillet, the first and second partial openings forming the substantially closed opening.

8. An inductor for heating at least one substantially cylindrical component of a metal workpiece, the substantially cylindrical component attached on at least one side to an irregularly-shaped component, a fillet formed between the irregularly-shaped component and the substantially cylindrical component, the inductor formed from a first inductor segment and a second inductor segment, the first and second inductor segments having means for magnetically coupling to the second inductor segment an ac high frequency current supplied to the first inductor segment, a substantially closed opening formed partially in the first inductor segment and partially in the second inductor segment for placement of the substantially cylindrical component for heating by application of a magnetic field to the component, the magnetic field generated by the first and second inductor segments in response to excitation by the ac high frequency current, the first inductor segment formed from a solid electrically conductive material, the first inductor segment further comprising:
- a first facing surface; and
- a first through opening forming a first coil segment and a second coil segment disposed on opposing sides of the first through opening;

the second inductor segment formed from a solid electrically conductive material, the second inductor segment further comprising:
- a second facing surface, the second facing surface disposed substantially adjacent to and electrically isolated from the first facing surface; and
- a second through opening forming a third coil segment and a fourth coil segment disposed on opposing sides of the second through opening;

the improvement comprising:
- at least one cross sectional passive current restricting slit disposed within the second inductor segment to form at least two electrically isolated coils in the second inductor segment, the at least one cross sectional passive current restricting slit dividing each of the third and fourth coil segments into a first and second pair of coil sub-segments;
- a first partial opening in either of the first or second pair of coil sub-segments comprising the third or fourth coil segment, the first partial opening having an arcuate coil surface divided by an orifice in at least one of the pair of coil sub-segments forming the first partial opening, the orifice dividing the arcuate coil surface into a first pair of coil lips, the first pair of coil lips forming an interface region with the adjoining second facing surface wherein the first pair of coil lips are profiled to selectively compensate for the irregular mass of the irregularly-shaped component, an opening on the surface of the substantially cylindrical component, or selective heating of the fillet;
- at least one cross sectional active current restricting slit disposed in the first coil segment and the second coil segment to form at least two parallel coils in the first inductor segment, the at least one active cross sectional current restricting slit dividing each of the first and second coil segments into a first and second pair of coil sub-segments,
- a second partial opening in either of the pair of coil sub-segments comprising the first or second coil segment, the second partial opening having an arcuate coil surface divided by an orifice in at least one of the pair of coil sub-segments forming the second partial opening, the orifice dividing the arcuate coil surface into a second pair of coil lips, the second pair of coil lips forming an interface region with the adjoining first facing surface wherein the second pair of coil lips are profiled to selectively compensate for the irregular mass of the irregularly-shaped component, an opening on the surface of the substantially cylindrical component, or selective heating of the fillet, the first and second partial openings forming the substantially closed opening.

9. The inductor of claim 8 wherein the number of the at least one active cross sectional current restricting slits is equal to the number of the at least one passive cross sectional current restricting slits and each of the at least one active cross sectional current restricting slits is oppositely aligned from each of the at least one passive cross sectional current restricting slits.

10. The inductor of claim 9 wherein the widths of all of the at least one active and passive cross sectional current restricting slits are equal.

11. The inductor of claim 10 wherein there is one active cross sectional current restricting slit and one passive cross sectional current restricting slit and the active and passive current restricting slits are sufficiently large so that only the fillet is substantially inductively heated.

12. The inductor of claim 11 wherein a flux concentrator is disposed in the spaced formed by the current restricting slits to direct the magnetic field toward the fillet.

13. An inductor for heating at least one substantially cylindrical component of a metal workpiece, the substantially cylindrical component attached on at least one side to an irregularly-shaped component, a fillet formed between the irregularly-shaped component and the substantially cylindrical component, the inductor formed from a first inductor segment and a second inductor segment, the first and second inductor segments having means for magnetically coupling to the second inductor segment an ac high frequency current supplied to the first inductor segment, a substantially closed opening formed partially in the first inductor segment and partially in the second inductor segment for placement of the substantially cylindrical component for heating by application of a magnetic field to the component, the magnetic filed generated by the first and second inductor segments in response to excitation by the ac high frequency current, the first inductor segment formed from a solid electrically conductive material, the first inductor segment further comprising:

a first facing surface; and a first through opening forming a first coil segment and a second coil segment disposed on opposing sides of the first through opening;

the second inductor segment formed from a solid electrically conductive material, the second inductor segment further comprising:

a second facing surface, the second facing surface disposed substantially adjacent to and electrically isolated from the first facing surface; and a second through opening forming a third coil segment and a fourth coil segment disposed on opposing sides of the second through opening;

the improvement comprising:

at least one cross sectional current restricting slit disposed within the second inductor segment to form at least two electrically isolated coils in the second inductor segment, the at least one current restricting slit dividing each of the third and fourth coil segments into a first and second pair of coil sub-segments, and a first partial opening in the first and second pair of coil sub-segments comprising the third coil segment, the first partial opening having an arcuate coil surface divided by an orifice in at least one of the pair of coil sub-segments forming the partial opening, the orifice dividing the arcuate coil surface into a first pair of coil lips, the first pair of coil lips forming an interface region with adjoining the second facing surface wherein the first pair of coil lips are profiled to selectively compensate for the irregular mass of the irregularly-shaped component, an opening on the surface of the substantially cylindrical component, or selective heating of the fillet, the fourth coil segment having a protruding substantially semicircular element;

a second partial opening in the first coil segment, the second partial opening having an arcuate coil surface divided by an orifice, the orifice dividing the arcuate coil surface into a second pair of coil lips, the second pair of coil lips forming an interface region with the adjoining first facing surface wherein the second pair of coil lips are profiled to selectively compensate for the irregular mass of the irregularly-shaped component, an opening on the surface of the substantially cylindrical component, or selective heating of the fillet, a third partial opening in the second coil segment, the first and second partial openings forming the substantially closed opening, and the protruding substantially semicircular element of the fourth coil segment seating in the third partial opening.

* * * * *